Sept. 22, 1970 C. J. HOLLOMAN 3,530,456

MATRIX STORAGE SYSTEM

Filed Dec. 12, 1966 10 Sheets-Sheet 1

| LETTERS UPPER CASE PALLET | CODE 6th PULSE ADDED FOR FIGURE I | II | III | IV | V | VI | FIGURES LOWER CASE PALLET |
|---|---|---|---|---|---|---|---|
| A | O | O | | | | | 1 |
| B | O | | | O | O | | 2 |
| C | | O | O | O | | | 3 |
| D | O | | | O | | | 4 |
| E | O | | | | | | 5 |
| F | O | | O | O | | | 6 |
| T | | | | | O | | 1/8 |
| U | O | O | O | | | | |
| V | | O | O | O | O | | 3/8 |
| W | O | O | | | O | | 1/2 |
| X | O | | O | O | O | | 5/8 |

INVENTOR
CHARLES J. HOLLOMAN
BY
Kane, Dalsimer, Kane & Smith
ATTORNEYS

INVENTOR
CHARLES J. HOLLOMAN
BY
Kane, Dalsimer, Kane & Smith
ATTORNEYS

INVENTOR
CHARLES J. HOLLOMAN
BY
Kane, Dalsimer, Kane & Smith
ATTORNEYS

MATRIX STORAGE SYSTEM

Filed Dec. 12, 1966

INVENTOR
CHARLES J. HOLLOMAN
BY
Kane, Dalsimer, Kane & Smith
ATTORNEYS

INVENTOR
CHARLES J. HOLLOMAN
BY
Kane, Dalsimer, Kane & Smith
ATTORNEYS

INVENTOR
CHARLES J. HOLLOMAN
BY
Kane, Dalsimer, Kane & Smith
ATTORNEYS

INVENTOR
CHARLES J. HOLLOMAN
BY
Kane, Dalsimer, Kane & Smith
ATTORNEYS

INVENTOR
CHARLES J. HOLLOMAN
BY
Kane, Dalsimer, Kane & Smith
ATTORNEYS

NUMBER OF SET WINDINGS FOR EACH MATRIX CORE

| | A | B | C | D | E | G GROUP COILS (REPEATERS) |
|---|---|---|---|---|---|---|
| 1 | 10 | 7 | 6 | 3 | 10 | 10 |
| 2 | 7 | 6 | 3 | 7 | 9 | 8 |
| 3 | 7 | 6 | 8 | 3 | 7 | 8 |
| 4 | 3 | 10 | 6 | 7 | 2 | 5 |
| 5 | 7 | 8 | 7 | 7 | 8 | 5 |
| 6 | 13 | 7 | 9 | 6 | 8 | 6 |
| 7 | 9 | 6 | 8 | 7 | 8 | 3 |
| 8 | 5 | 4 | 9 | 9 | 2 | 4 |
| 9 | 5 | 7 | 9 | 5 | 6 | 2 |
| 10 | 5 | 5 | 7 | 7 | 4 | 2 |
| 11 | 3 | 7 | 8 | 7 | 3 | 0 |
| 12 | 1 | 2 | 1 | 2 | 1 | 0 |
| 13 | 0 | 1 | 2 | 3 | 1 | 0 |

INVENTOR
CHARLES J. HOLLOMAN
BY
Kane, Dalsimer, Kane & Smith
ATTORNEYS

Sept. 22, 1970 C. J. HOLLOMAN 3,530,456

MATRIX STORAGE SYSTEM

Filed Dec. 12, 1966 10 Sheets-Sheet 10

INVENTOR
CHARLES J. HOLLOMAN
BY
Kane, Dalsimer, Kane & Smith
ATTORNEYS

United States Patent Office 3,530,456
Patented Sept. 22, 1970

3,530,456

MATRIX STORAGE SYSTEM

Charles J. Holloman, Stamford, Conn., assignor to Trans-Lux Corporation, New York, N.Y., a corporation of Delaware Filed Dec. 12, 1966, Ser. No. 601,071
Int. Cl. G08b *23/00;* G09b *13/00*
U.S. Cl. 340—324 6 Claims

ABSTRACT OF THE DISCLOSURE

A storage matrix system for representing selectable points of a character for display in accordance with binary coded information utilizing a multiplicity of magnetizable cores each of which is provided with a plurality of individual windings which are selectively energized in serial fashion over a plurality of rows and columns from a single input terminal and a separate readout winding for each magnetic core and means to energize the readout windings to display the information in the individual cores.

The matrix circuit is composed of a substantial number of magnetic energy-storing cores. Use of such stored energy permits a control of a display of visible indications or intelligence which are placed in viewing arrangement to be seen by one or many people. The controlled and displayed intelligence may be in one or another of selected forms, such as letters or figures, or combinations of both. In some instances, pictorial information can be provided with equal facility.

The invention, as it is constituted, utilizes as the storage media a substantial number of ferrite cores about which one or a plurality of independent windings are suitably grouped. The windings are so arranged in relation to the ferrite cores that whenever a winding is energized by electrical signal energy it is possible to produce in the core a magnetizing effect which can be later transferred to an output circuit to control an appropriate display of characters or pictorial information corresponding to the energizing current or signal energy. There is a unique control of the number of instantaneously activated magnetic cores used to determine the information to be displayed. The control pattern derives energy from those cores which are instantaneously energized because they are arranged in a pattern to provide the desired display of any particular representation or character which is desired. The information for displaying each letter, figure or bit of pictorial intelligence is supplied to the storage core matrix in parallel and as a complete character representation. Read-out of the stored information is derived sequentially and is released preferably in columnar fashion under the control of a suitable readout pulse.

Where the storage matrix is adapted for controlling the display of letters or figures, for instance, the several cores correspond in number to the number of display points of any panel section which is to be viewed. Signal energy for recreating the characters is generally supplied as a coded binary form of message. The signal input is fed to suitable windings on the cores and provides storage of information in the core material from which, at appropriate and chosen times, it can be selectively retrieved. A selected arrangement of rectifier diode elements is utilized to prevent premature release of the stored information from any of the cores. The core windings are so placed that storage of energy may come about whenever signal energy pulses are supplied. The connections are such that the applied pulses will develop a forward bias on the rectifier diode elements. Then, upon demand, and under the influence of a read-out pulse signal, information previously stored can be released at appropriate selected times to an output circuit.

In one of its preferred forms the invention is adapted for controlling the operation and positioning of a plurality of bistable display disc elements appropriately mounted and supported on display panel units. The disc elements are ordinarily formed to be turnable from one bistable position to another so as to be viewable selectively from one side or the other. Provisions are made so that in accordance with the stored information in the matrix the discs at read-out time may be turned, as necessary, to have the image display face turned to assume a position facing toward observers. Each display disc preferably has one of its surface areas coated with a phosphor material that tends to glow, particularly under ultra violet excitation. The opposite side of the discs is usually provided with a non-reflecting coating, which, illustratively, might be a dull black. The release of stored signal information from the matrix provides the control required to have one or the other of the discs faces form the desired character outline. Alternatively, for instance, one disc face can be black and the other a contrasing color, such as white.

One method of controlling display of the observable face of each of the plurality display discs is described in the United States patent application of this inventor, filed Dec. 12, 1966, which is identified as Ser. No. 600,-900, and entitled Display Apparatus, to which reference is here made for such parts of its disclosure as may be helpful to this application, with such parts being incorporated herein by reference. At this point it may be mentioned that if a bright outline of a character is desired to appear on a dark field, the control turns the selected discs to display the phosphor-coated side for viewing. If a dark outline on a bright field is desired, the signal energy stored controls the positioning of the dark side of the discs. Following each display, all discs of the field are turned to a like positioning so that signal control can then cause the next desired display character to form.

The display unit is particularly suitable for displaying stock ticker prices. Such displays are composed of letters to identify the particular stock and figures to identify the prices on which trades are made or the prices at which the particular stock may be offered or bid. The control signal pulse energy used to activate or energize the ferrite cores of the control matrix for creating the characters is applied through the core windings. It is available as the output energy of a suitable form of pulse register to which incoming signal energy is supplied and then fed through suitable decoding elements in known fashion. The signals are coded as received and are decoded in any desired known fashion to provide the control of character recreation.

Following a practice presently adopted in transmitting information concerning market transactions on the New York Stock Exchange, it is now customary to provide a series of signal pulses allocated to six different positions for each character to be displayed. As a general rule, the pulses transmitted are of binary form so that in each of the positions, the presence of a pulse may signify a "1" condition or the absence of a pulse may signify a "0" condition. Normally, letters are designited by the presence or absence of signal pulses in the first five of the positions. If the designation is to be a figure, the sixth position appears as a "1" as contrasted to an "0" if letters are to be displayed. According to the code most commonly in use, which is known as the ticker type-box and function code, as an illustration, the letter A is represented by pulses in the first two positions followed by an absence of pulse in the next four positions, after which a shift indication, having nothing to do with the designation to be represented, appears in the signal for the purpose of identifying the termination of each separate indication. This means that for the letter A the pulse designation would be 110–000. Following the same practice, for instance, the letter F would be designated 101–100. If now, it were desired to write the numeral "1" in the code, the designation for this number would normally be like that for the letter A except for a "1" appearing in the sixth position, making the designation 110–001. By a similar pattern, the designation for the numeral "6" would be like the letter F but having a "1" in the sixth position which would make the designation "101–101."

Thus, the presence or absence of a signal pulse is utilized to control the operations of a signal display thereby to provide a control which is completely predictable and reliable, as well as a control which is much less in cost, which will occupy less space and which will comprise substantially fewer elements than any now known similar unit. The control for the complete operation is derived by control energy from a suitable shift register and, then, through the use of appropriate flip-flop circuits and decoder units, pulse energy may be derived for controlling introduction of pulse energy into the core windings, thereby to produce an energy storage of sufficient magnitude that, when released, a control element may be activated with sufficient power to operate an output device directly and without intermediate sensing amplifier. The matrix, therefore, can be considered substantially in the light of a pulse transformer adapted to produce signal control for energizing a display panel unit which may be caused to travel in the full field of view of observers. The control of the position of the display discs already mentioned is preferably, although not necessarily, in accordance with the disclosure of this applicant in the United States patent application filed Dec. 12, 1966, which is identified as Ser. No. 600,875 and entitled "Receiving Distributor Circuit." The circuitry described in the last-named application provides the activation pulses for energizing the matrix herein described and thereby provides the control of the shifting of the display discs to different light values by energization of coil windings arranged to control the operation of suitable air valves adapted to rotate the display discs through a 180° angle. This last-described feature has been disclosed in this applicant's United States patent application filed Dec. 12, 1966 which is identified as application Ser. No. 600,901 and entitled "Signaling Circuit."

Among the objects of the present invention, therefore, are to provide a controlled magnetic energy storing matrix such that the control may be released in any desired sequence, thereby to establish the exhibiting of intelligence characters on a display panel, with the display characters being available regardless of the fashion in which the storage occurs. Other objects of the invention are those of providing a display arrangement of high accuracy which may be installed at a minimum cost. Further objectives are to provide a display control matrix formed from a multiplicity of energy storing cores of a substantially reduced number, and which may have substantially fewer windings thereabout than the number of points to be displayed in the display characters with which this invention is particularly concerned and, therefore, to amplify and improve the character reproduction.

Other obejcts of the invention are those of interlocking various windings wrapped around the energy storage cores of the matrix and utilizing other windings with transformers forming as a winding group for portraying characters through a multiplicity of connected windings by way of which points of different characters which are spaced identically may be displayed.

The broad features of the invention are particularly set forth by the accompanying description and the several figures of drawings. As will be clearly ascertainable from a reading of the accompanying drawings.

FIG. 1 is a representation of a portion of a typical code for setting up letter and figure characters which are adaptable to binary pulse indications which, when released from a selecting shift register, will provide the necessary controls to energize suitable decoding circuits from whose output the signals to provide the storage for recreating a plurality of display element points is derived. This figure is partly broken away to show examples of several letters and several figures but not showing the entire code since such representations can be varied as desired;

FIG. 2 is a schematic representation of the matrix by which different letter and different figure characters are formed. Illustratively, the left portion of the figure shows the letter A and the adjacent portion shows the figure 3/8, which each may be considered typical of those developed. The two characters may be considered here to be formed on two adjacent display panels;

FIG. 3*a* and its sub-part FIG. 3*b*, provide, when positioned with FIG. 3*a* adjacent to FIG. 3*b* and above FIG. 3*b*, a showing of the coil matrix arrangement by which the different letters and figure characters are developed under pulse energization. In this figure, the sections marked A through E are typical of the panel arrangement for displaying the characters, with the section marked G representing certain group coils or repeaters. Further, certain parts of repeating nature not required for explanation are omitted in the two figures, it being provided that normally the columns B through E comprise 13 cores each and column A will comprise 12 cores (making a total of 64 for the assumed example); and normally these cores will be arranged, for the same example, in a series of rows, as shown. The connections between core windings are exemplary of the coil energization sequence for producing a typical letter configuration, such as the letter A. Following this diagram and relating the coil positioning to the dot and disc positioning of FIGS. 2 and 7 there is a further schematic representation to show a portion of the ferrite cores on which the matrix is formed, with the showing restricted to the energizing windings but not including a showing of read-out or transfer windings for energizing output circuits. In this consideration, the drawing should be considered as if the sections A through E actually can be regarded as representing columns on the panels of FIG. 2 although, for convenience, in this figure they have been drawn to extend in a horizontal direction. The control will be apparent from the description to follow.

FIGS. 4*a* through 4*d* constitute schematic logic diagrams for interconnecting the cores of the display matrix to provide for the display of a substantial number of letters of the alphabet and figures desired for making the displays. These figures are to be viewed as if placed adjacent to each other with the long dimensions bordering and the figures are intended to be positioned 4*a*, 4*b*, 4*c* and 4*d* above one another in the alphabetical sequence, as noted. The letters and figures external to the circles are intended to represent ferrite cores and designate by reference the activated portions of the matrix for the selected characters and the numerals inside the circles indicate the winding pair terminals with which the coil is associated, e.g., the numeral 6 within the circle shows connections 11 and 12 at winding 6.

Figure 1:
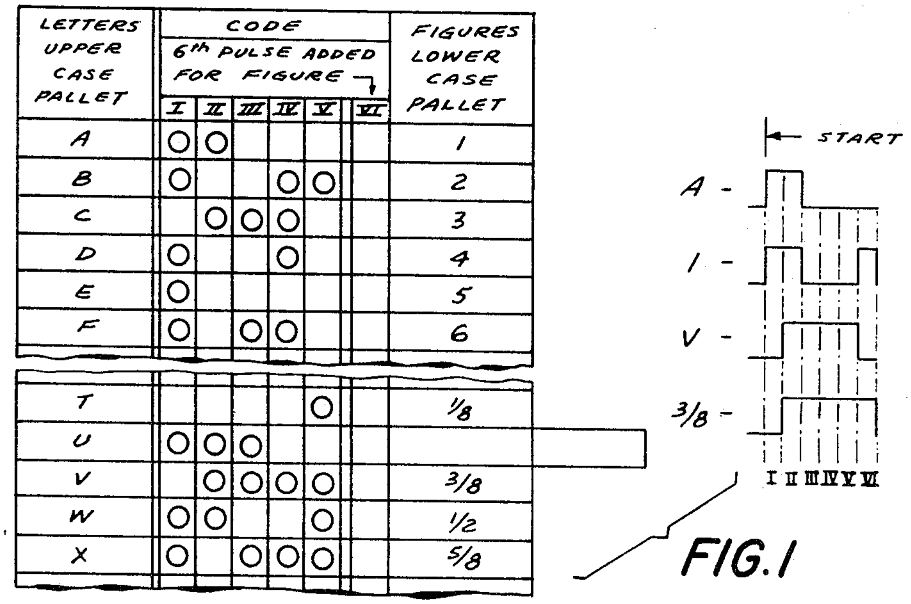

Reference may now be made to the accompanying drawings for a further understanding of the full and complete nature of a preferred form of the invention. By FIG. 1, there is shown a portion of a chart including certain letter and figure combinations. There are letter designations at the left of the chart. Numerical identifications appear at the right. Between these, there are six separate columns which are numbered with Roman numeral designations I through VI. The five columns to the left of the double line are directed to conditions obtaining for the production of letter character reproductions. As the table has been filled in, the circles represent pulse or marking conditions, such as a "1" designation, whereas the blank spaces represent the absence of a pulse or a "0" condition. Following the format of this table or chart, it can be seen that to represent letters the first five positions may a "1" or a "0" with the sixth position always a "0." If figures are to be represented, the last or sixth column position always appears as a "1" designation, with the first five columns either a "1" or a "0."

Illustrative of the conditions and the pulse series that are represented, if the letter A is to be represented, for instance, positions 1 and 2 (corresponding to the showings of columns I and II) will be shown as a "1." All of the third through sixth positions corresponding to columns III through VI will be represented as a "0" (zero). Thus, the letter A is represented as 110–000. This format for the pulse is shown immediately to the right of the figure, noting the start position constitutes the commencement for column I and that a pulse appears in a position that identifies each of columns I and II.

If now it should be desired to designate the figure "1," then, it can be assumed that a circle designation would also appear in the sixth column to the right or the letter A and to the left of the numeral "1," the circles again representing pulses. Thus, the format of pulse formation for the figure "1" would be as shown to the right of the chart. This would be 110–001.

As another example, if the letter V is to be designated, it may be seen that there is a zero in column I but that a "1" appears in all of columns II through V. Thus, the letter V in the illustrated code would be designated 011–110. If now it were desired to designate the fraction ⅜, for instance, it can be assumed that column VI would be represented by a "1" designation. In this event, the code for the fraction ⅜ would be 011–111. The signal pulse series then may be like that which appears to the right or the designation ⅜.

In carrying through this form of control, the series of incoming pulses in any or all of the designated six position thus establishes which letter, number, fraction, character or other designation is to be represented. Providing six separate columns of pulses permits the production of sixty-four completely different designations, this being $2^6$. In the control, suitable circuitry to segregate and designate the required letter, figure or other character may be determined in any desired fashion to produce suitable output signals. The code above mentioned, per se, is known and, as illustrated, does not represent applicant's invention but does represent one code for which the invention may be used. The code illustrated is one that may be used to produce the control here set out.

Selection of the characters in accordance with the code selection may be carried out by various types of apparatus although the receiving distributor circuit described and claimed in application Ser. No. 600,875 filed by this applicant on Dec. 12, 1966 and entitled "Receiving Distributor Circuit" is one selecting type that has been found suitable and fully usable.

The recreation of the code into visible designations and suitable display panels may also be carried out in various ways. One form of display panel which may be used for this purpose is illustrated by the schematic showing of FIG. 2 of the drawings where two adjacent panels are represented. Further details of the panels of the type suggested and their control are shown in applicant's copending application entitled "Display Apparatus" filed Dec. 12, 1966 as Ser. No. 600,900.

Figure 2:
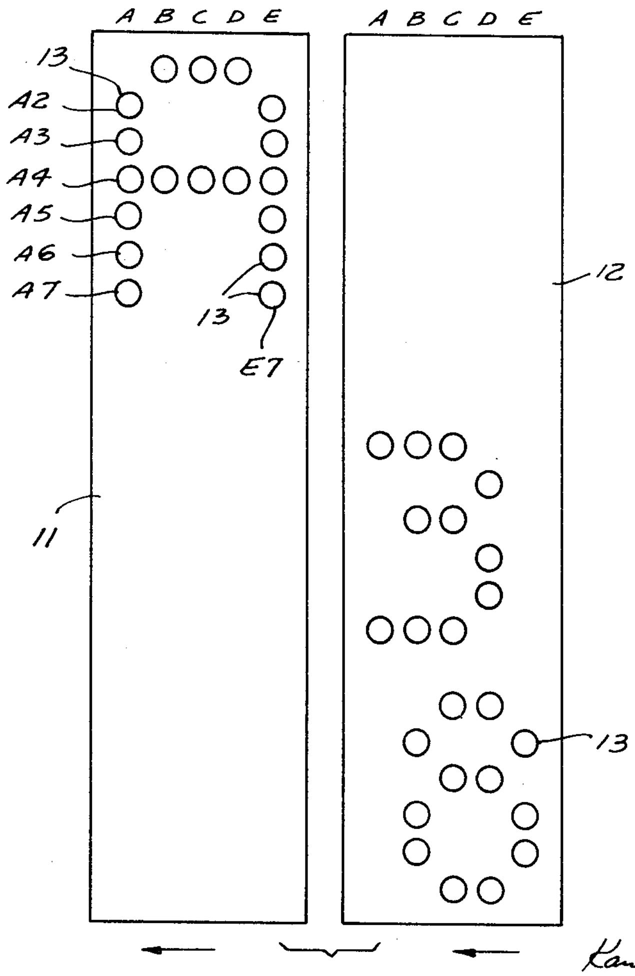

As depicted by the panel showings of FIG. 2, each display panel may be assumed to be formed of a series of five columns and twenty-three rows of characters to which the code designations can be adapted. By suitably tying the control of certain discs to be selected and grouping them operations may be simplified. The disc format and operation are explained in the aforementioned application Ser. No. 600,900. Suffice it for this application, therefore, merely to show by the assumed adjacent panels 11 and 12 that the circles represent discs turned in a position to make the character visible and that all other positions on the panels which would correspond to a circle in all of the other disc positions have the discs turned to a position which generally shows as black. The discs, as represented at 13 on the panels, may each be considered to be supported upon a horizontal spindle held to the panel and capable of being turned through approximately a 180° angle to move the disc between two limiting bistable states. One side of each disc 13 is normally provided with a black or non-reflecting color; the other side of each disc is normally made of a highly contrasting color and is bright or at least coated with a substance which, particularly under illumination, tends to fluoresce to provide an outstanding character.

So arranged, the discs with selection provide the character outline bright against a dark background. It could be reversed if it be assumed that the dark face of the disc is to produce a dark outline against a bright background.

Normally, a large group of panels, each as shown at 11 and 12, are so arranged in a substantially belt formation to travel through a viewing field. All discs on the panel may be considered as if divided into upper and lower sections. So grouped or divided, the upper section may be considered to comprise the five columns of discs, as well as the first ten rows. Generally, the letters will be produced in this region of the panel. The lower section of the panel then may be considered to be divided into the same five columns but into thirteen rows arranged below the upper ten rows. In this lower section, numerals or fractions or, in some instances, small letters, are usually depicted. In the showing of FIG. 2 following such pattern, the upper section of the left-hand panel 11 shows the letter A, occupying seven rows. The lower section of the right-hand panel 12 shows the fraction ⅜, occupying thirteen rows. In the example, three rows between the letter A and the fraction are blank.

Figures 6, 8:
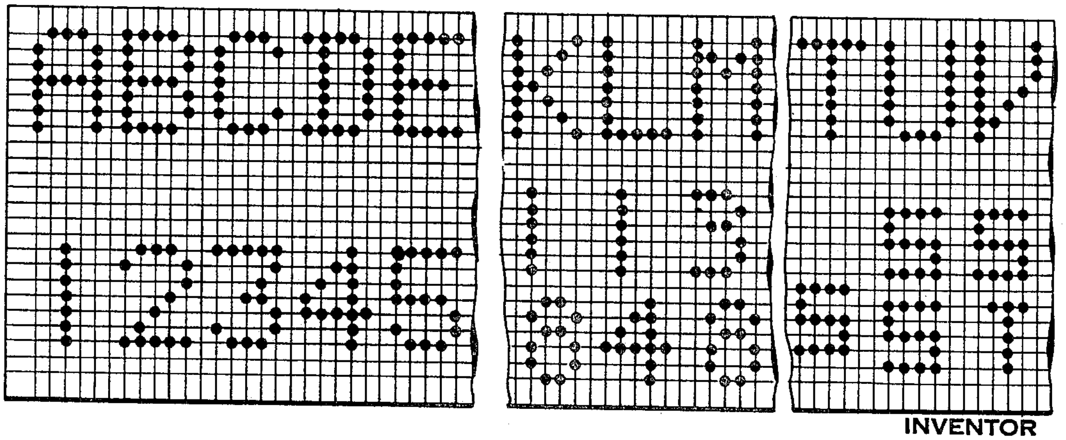
FIG. 6 is a chart diagram to show the number of set windings for each matrix core; the ordinate numbers at the left indicating the horizontal positioning of the cores and the abscissa letterings across the top indicating group coils of the repeaters.
FIG. 8 is a figure in some respects similar to FIG. 2 but showing a part of the alphabet arrangement for depicting letters and a plurality of numerals and fractions for designating figures.

Making reference to FIG. 8 for the moment, a further portion of the alphabet and certain numerals and fractions, as well as certain lowercase letters, have also been shown and illustrate the division of the panel into different sections. The control provided by the receipt of the sixth pulse, as already explained, may be utilized to switch the control of the display disc positions on the panels in any desired fashion between the upper and lower sections, as noted, for instance, by the relative separation of letters and figures. In the event that a different coding is used, it will be apparent that the switching can be made optional by the receipt of a separate pulse. Suffice it to say that the particular switching arrangement is not, per se, part of the invention but is merely referred to for completeness of description.

Figure 3A:
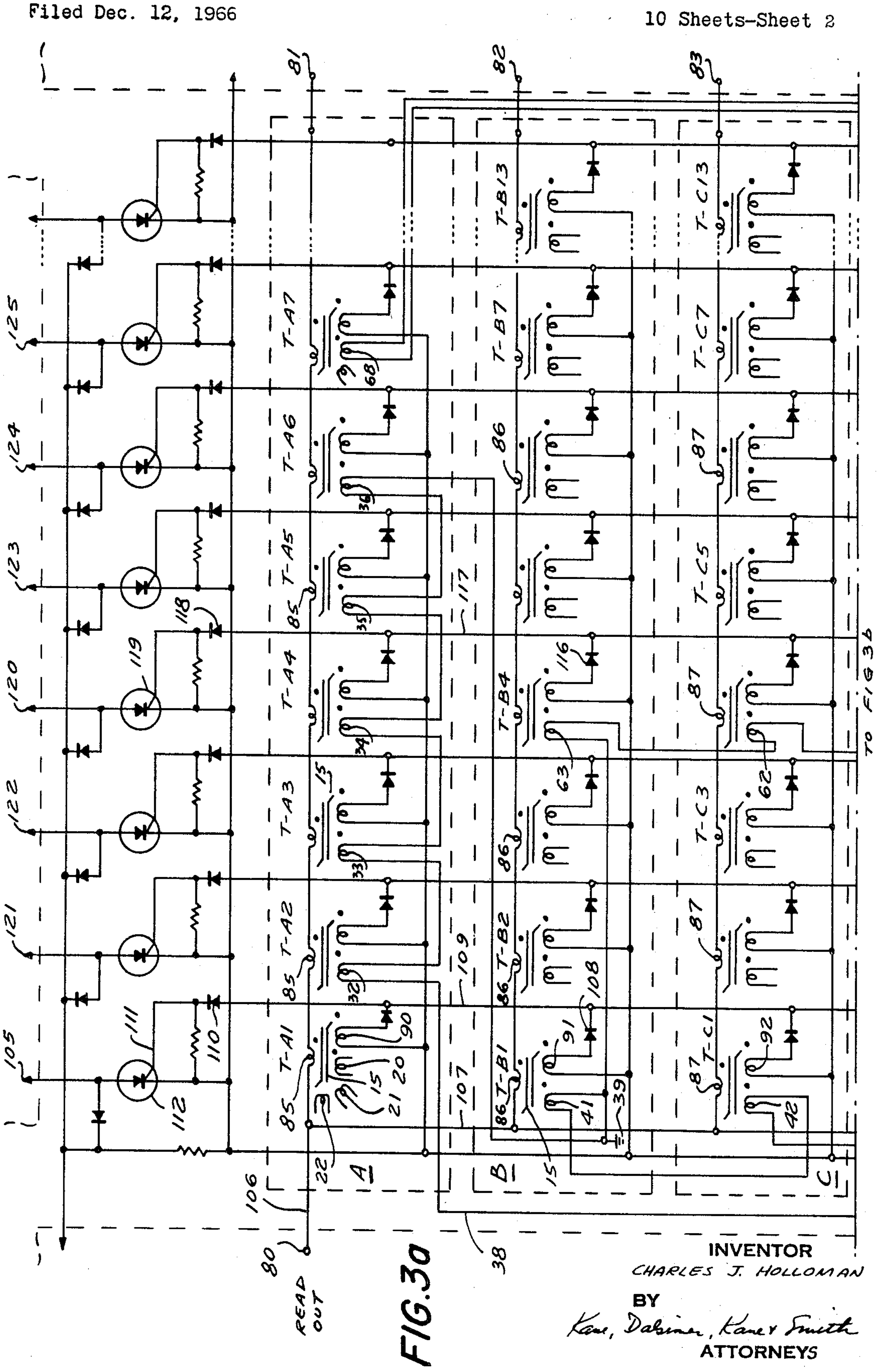
Figure 3B:
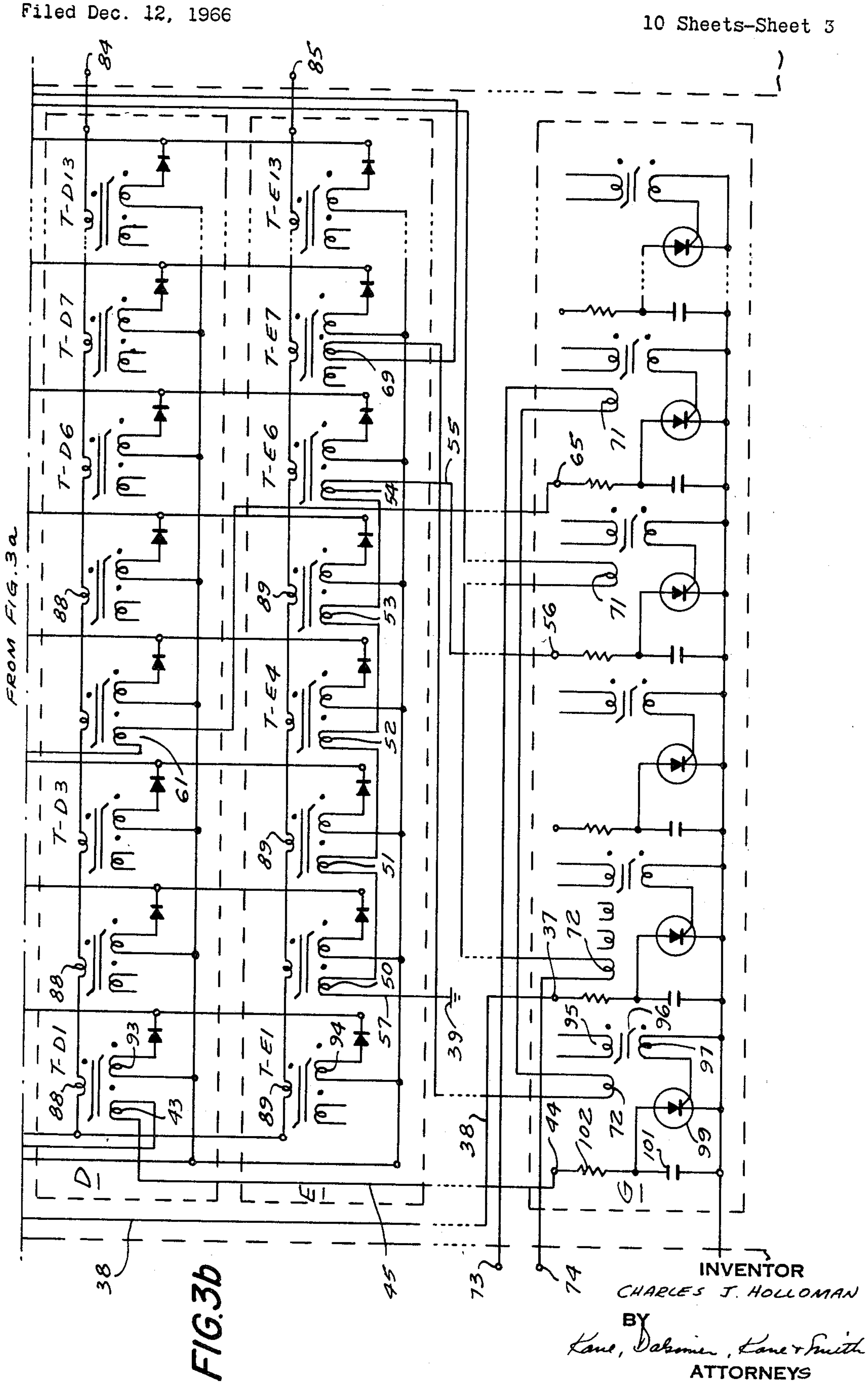

Reference is now made to FIGS. 3*a* and 3*b* in combination, with the pages turned horizontally with the inventor's name shown to the left and with the lower portion of FIG. 3*a* assumed to be connected to the upper portion of FIG. 3*b*. The so-placed figures illustrate the general pattern of the matrix by which the disc control is achieved. It will be seen that a multiplicity of control windings formed into the five distinct sets has been displayed and designated by the letter characters A through E, inclusive, in the blocks included within the dash outlines which each represent one group. These sets are indicative of the columns of the display panel of the character shown by FIG. 2. For convenience of illustration, FIGS. 3*a* and 3*b* actually show the columns of FIG. 2 in what appear to be rows and to the right of these drawings, it will be noted that dash lines indicate that certain of the windings and cores, which will be explained, have been omitted from the illustration since they are essentially duplications of parts shown and are not needed for the initial explanation.

For convenience of showing, the numbering of the magnetic cores has adopted a combination of letters and figures, due to the general similarity of cores and their windings. The identifications so made are considered to provide easier and more ready identification. The first letter of these groups will be shown as T to designate the ferrite core. The second letter designation, such as A will show the column in which the winding is located and the third numerical designation will show the core winding number considered from right to left. In this respect, it may be noted that the various cores 15 may all be considered as being in the general form of a ferrite ring 16 (see FIG. 7). The rings or ferrite cores 15 of column A are designated respectively T–A1, T–A2, T–A3 and, on the drawing, these extend through T–A7. Actually, the series extends in column A through T–A12 but, for the sake of convenience, this has not been shown. There is no core or winding in the position that would correspond to T–A13. In columns B, C, D and E, it can be seen that the cores or windings are first numbered T–B1, T–B2 and continue through T–B13. The same is true for the windings or cores in columns C, D and E.

Figure 7:
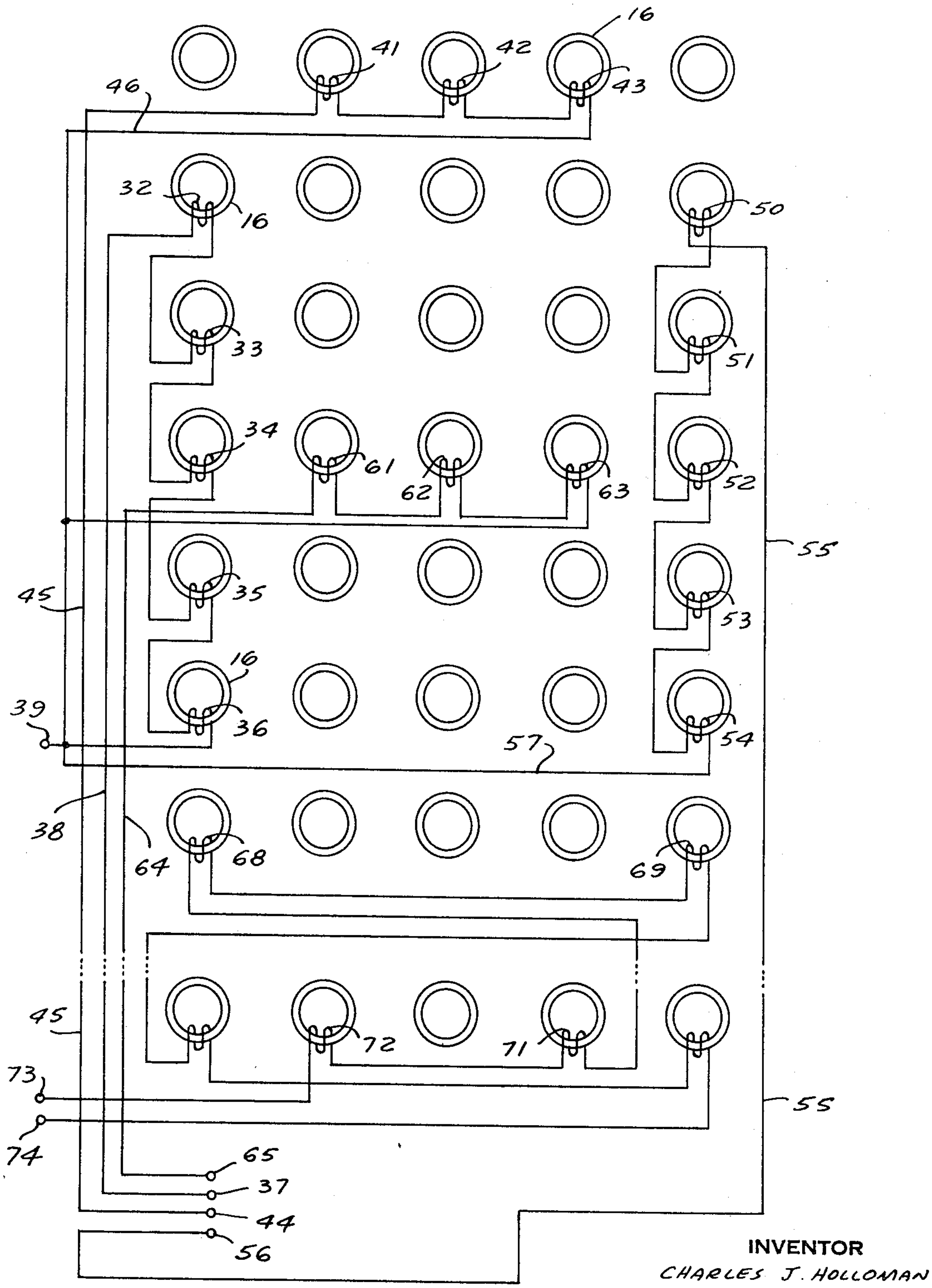
FIG. 7 is a sketch of the various plurality of cores and shows particularly the group windings for forming the letter A as one example.

Referring for the moment to the type of ferrite core shown at 16 in FIG. 7, it will be appreciated that these cores are of the general type that is well known. The cores usually are pressed from a powdered form consisting of a ferrite into ring formation of very small diameter. In making this invention numerous windings, as will later be explained, are wrapped about the cores. As referred to by the table of FIG. 6, the number of separate windings to form each character is substantially reduced by linking together various single windings to serve multiple purposes. Illustrative of this condition, but not in any respect limited to an actual showing, or to indicate that all letters or figures have the same grouping, it may be noted that for the letter A, windings which would be located in positions or rows 2 through 6, inclusive, of column A may be controlled simultaneously (see FIG. 7). A similar condition can be observed by noting that the letter M (see FIG. 8) also has points in the same position to be represented and it could similarly be controlled. Without carrying the illustration too far, note may also be made that the same conditions hold for the letters U and E, although this is not necessarily true for all letters having similar shapings. However, it is illustrative of the general plan and arrangement.

Suffice it at the moment to state that each of the cores 15 has a plurality of input windings such as 20, 21 and 22, and so on (not shown). These windings identified may be considered as typical for the entire matrix and other separate input windings will not be referred to except for the purpose of illustrating the grouping of the different windings for different input signal pulses. In this respect, it may be mentioned at this point that on FIGS. 3*a* and 3*b*, the winding connections for energizing the cores to produce the letter A are provided. Then, by reference to FIGS. 4*c* and 4*d*, the input terminal 25 of FIG. 4*d* may be assumed to constitute the point at which pulses corresponding to "110" (the first three for the formation of the letter A, as above noted) may be assumed to be received. Then, the circuit is completed by an appropriate connection to terminal 26 (see FIG. 4*c*) whereat designations of the last three digits, namely "000" for the letter A, will be received. It will be explained further, but at this point suffice it to note that in the formation of the letter A, it can be assumed that a connection is established between terminal point 25 (FIG. 4*d*) through to terminal 30 (FIG. 4*d*) and then to terminal point 31 (FIG. 4*c*) and thence to terminal 26 (also of FIG. 4*c*). The circles on FIGS. 4*a* through 4*d* represent, conventionally, certain windings (or groups of windings) which will be energized.

FIGS. 3*a* and 3*b* jointly, and bearing in mind the format of the letter A from FIG. 2 it can be seen that the letter A (as also depicted by the windings of FIG. 7) is formed (in part) when discs 13 in positions 2 through 6 of column A (as shown by discs A2, A3, A4, A5 and A6) are turned to their display position. These discs may be turned by control initiated by the serially connected windings 32, 33, 34, 35 and 36 which connect at one end to terminal point 37 and then, through conductor 38, through the respective windings, back to terminal point 39, which, in this instance, may be considered as ground (see FIG. 3*a*). This provides for turning the discs on all of the left-hand vertical positions of the letter A except for the lowermost point. The three top positions of the letter A, which are represented by positions B1, C1 and D1 are controlled by energization of windings 41, 42 and 43, with the control being established from terminal point 44 through conductor 45 and thence serially through the windings 43, 42 and 41 and then back to conductor 46 to terminal point 39.

The four points on the right-hand side of the A which appear in positions E2 through E6, inclusive, are developed by windings 50 through 54, inclusive. These windings are serially connected so that one end connects through conductor 55 to terminal 56 and the other end through conductor 57 to the ground terminal 39. The center arm of the A at positions B4, C4 and D4 is energized respectively by windings 61, 62 and 63, all serially connected with one end grounded at 39 and the other end connected through conductor 64 to terminal point 65. The only other positions on which it is necessary to control the display for producing the assumed letter A will be found to be A7 and E7, which are represented by the windings 68 and 69, respectively, upon the ferrite cores at such locations on the panel. The windings 68 and 69 are serially connected, as were other windings. As can be seen particularly from FIGS. 3*b* and 7, they are serially connected also through the windings 71, and 72 with one terminal leading to point 73 and the other to point 74.

Under the stated conditions, any time voltage pulses are supplied through any of the group of windings, it can be seen that the ferrite cores are magnetized. In this state, energy can be passed along to an output circuit at such times as a control "read out" pulse is applied through the matrix. The "read out" pulse is applied at terminal 80 (FIG. 3*a*) from which it is successively applied to the columns A, B, C, D and E by commutating in any suitable manner between terminal points 81, 82, 83, 84 and 85 of the respective columns in rapid sequence until output energy is selectively available from the matrix. The rate of commutation should be coordinated with the rate at which control signals are received and the rate of normal movement matched thereto. This specific feature is not, per se, a part of this disclosure and will not be further discussed except to state that any suitable and known control mechanism may be used.

The read out pulse is applied to the ferrite cores 15 through read out pulse windings 85 for column A, 86 for column B, 87 for column C, 88 for column D and 89 for column E. As can be observed from the circuit diagram of FIGS. 3*a* and 3*b*, the read out pulse, when applied, will, if the core has been magnetized, cause an output to be developed through the output windings 90 through 94, inclusive, of columns A through E, as well as all other secondary windings in the same columns. Magnetization of the ferrite cores may be assumed to have been effected initially either by a direct connection of one of the windings such as 20, 21 or 22 or any other winding member either directly or through one of the connections shown by column G. Suffice it at the moment to state, for instance, that a control pulse has been received in column G on the input winding 95. This pulse is made effective through the core 96 on the secondary winding 97 and serves to trigger the SCR device (silicon-controlled rectifier) 99. The result is that the voltage to which the capacitor 101 had charged is removed and the damage in potential then effective at the junction of resistor 102 and conductor 45 provides a pulse effective through the windings 43, 42 and 41 on their associated ferrite cores. The applied voltage changes the magnetization of each core through the associated winding to an extent such that when the read out pulse is applied through one of the windings used for the purpose, an output will be developed from one of the secondary coils to provide an output current flow through to an output terminal such as 105. Illustratively, it may be assumed that appropriate commutation takes place in any desired manner between the terminals 81 through 85 and back to 81 to repeat the cycle at a regular rate.

Read out pulses are applied at terminal 80 each time commutation between any two of the terminals 81 through 85 occurs to connect terminal 80 thereto. If it be assumed, for illustrative purposes, that the read out pulse is applied at terminal 80 while the circuit closes through the B column at terminal 82, then, that pulse is applied through conductors 106 and 107 and the several serially connected windings 86 of the B column to reach terminal 82. This then, causes an output pulse, for the assumed example, to be transferred through the winding 91 (in the illustrated instance, since energization of winding 41 had previously magnetized the core 15) to the output terminal 105. This pulse is effective through the diode 108 and conductor 109, diode 110 and conductor 111 to pulse the SCR into a conductive state to apply an output pulse at the terminal 105. The terminal 105 connects, as is explained in applicant's companion application to energize, the windings of a magnet to control the positioning of a display element (see FIG. 8) coordinated to any one of the positions for display.

The foregoing thus constitutes an illustrative example of the control achieved when readout occurs to produce part of the assumed letter A within the position corresponding to the first display member in column B. However, in the same column, the ferrite core in position B4 is also energized so that the readout pulse supplied through conductors 106, 107 will not only be effective to produce an output at terminal 105 but also, by virtue of the energization of the winding 63 for the ferrite core in position T–B4, an output is derived at terminal 120 through a diode 116, conductor 117, diode 118 and through the SCR 119. It will be observed that this activation then produces a change in the position of the display members in column B which must be activated in the production of the letter A. Without going further into details at this point but bearing in mind the discussion already had with respect to FIG. 7 and the more general reference already made to FIG. 2, it may be appreciated that activation of other windings on the cores will, with readout, produce different output signals. In the instance shown, it, illustratively, may be noted that output terminal 105 controls a display member in the uppermost row; output terminal 121 will control a display member in the next row down; similarly output terminal 122 will provide the signal to control a display member in the third row down and output terminal 120, has already been discussed as providing the signal to control the positioning of display members in the fourth row down. Thus, from what has already been stated, and with it being a requirement that all display members in each column of the panel which are to be used in the particular letter or figure formation must be simultaneously activated, the previous energization of windings 32 through 36 as a group of windings in positions from T–A2 through T–A6 simultaneously produces an output signal at all of output terminals 121, 122, 120, 123 and 124 concurrently. This is achieved because the core windings 32 through 36 are serially connected with the other (see FIGS. 3*a* and FIG. 7). However, simultaneously with the release of an output signal, as above stated, if the commutation is such that the readout pulse at terminal 80 feeds through to output terminal 81 then already the previously stored magnetic effect on the ferrite core upon which winding 68 is placed, will produce an output signal to terminal 125. Thus, all of the vertical row and display members on the panel which are necessary to produce the left-hand vertical portion of the letter A can simultaneously be effected by the output signal instantly developed.

By applicant's co-pending application, Ser. No. 600,900 filed with this application and entitled "Display Apparatus suitable magnetic control means for bringing about the positioning of suitable display elements have been described. The magnetic control means in each of the positions in the columns may be assumed to be connected to the output terminal points of similar positions. Thus, the release of an output signal, say at terminal points 105 and 120, will control the display elements of the B column in the first and fourth rows if activation is to be achieved in the second column (that is, the B column).

For reasons of convenience, neither FIG. 7 nor the combined FIGS. 3*a* and 3*b* show any specific number of windings on the various ferrite cores. However, it may be understood that in addition to the readout winding and the output winding, as well as the readin or write windings shown, numerous additional windings may be provided. For the purpose of illustrating one convenience form and pattern for providing a control which will energize selected members of windings on the different cores in each of the selected positions, the pattern depicted by FIGS. 4*a* through 4*d*, inclusive, may be considered examples. This pattern will also indicate which winding on different cores may be serially connected for the production of any selected characters in the form of letters or figures and which can be separately energized. In some instances, different letters which appear to have points in common with other letters or figures, may be energized in a different fashion.

Reference has already been made to the control windings for producing the letter A. Illustrative of the conditions already expressed for such letter reproduction and bearing in mind that for the production of the letter A as illustrated by FIG. 1, the coding had been assumed to be 110–000. The signal path between terminal points 25 (see FIG. 4*d*) and 26 (see FIG. 4*c*) has already been briefly discussed. For further guidance, however, this signal path will now be discussed in further detail. The windings on the ferrite cores in any position of any of the five columns in which the letter A is developed are simultaneously energized each time the signal appears. The signal path for developing the letter A is from terminal point 25 through conductors 130, 131 and 132 through group windings G2 and G4 (as will be explained further with reference to FIG. 5) and thence, through diode 131 to terminal 30. A connection is then established between terminal 30 (see FIG. 4*d* and terminal 31 (see FIG. 4*c*) which continues through a winding in position A7 and a winding in position E7 and thence, through conductor 132 and another group winding G1 from which, by way of conductor 133, a connection is made through a group winding G5 which connects through conductor 134 to terminal 26.

In this respect, it may be observed that the only individual windings for the letter A are windings in row 7 of each of columns A and E which are further exemplified in FIG. 2. The remaining connections to produce the letter A, being through windings G2, G4, G1 and G5 may now be explained by reference to FIG. 5.

By the drawings, in FIGS. 4A through 4D inclusive, the windings which are in different positions on the ferrite cores have been indicated by both letter and figure designations shown outside the circled schematic simulation of windings on cores. Externally of each such circled schematic designation, the letters represent columns and the numbers represent the winding position or row. Thus, a designation such as A1 placed externally to the circle indicates that this is a winding in the first row of column A. The numerical designation, for instance, shown by the numeral 4 positioned internally of the circled schematic representation of the ferrite core indicates the winding on the ferrite core. Thus, a numeral 4 indicates, for instance, the fourth winding on the core. Illustratively, this would also designate the set of conductors leading away from the winding. If the number were a "4" it would indicate that the connection established through the winding on the designated core would be from terminals 7 and 8 of the group. A designation such as A5 external to one of the circled positions would mean the winding of row 5 of column A and, if the internal designation happened to be a "1" this would mean that the connection would be made to conductors 1 and 2 or, stated differently, this would be the first winding in the set.

Figure 4A:
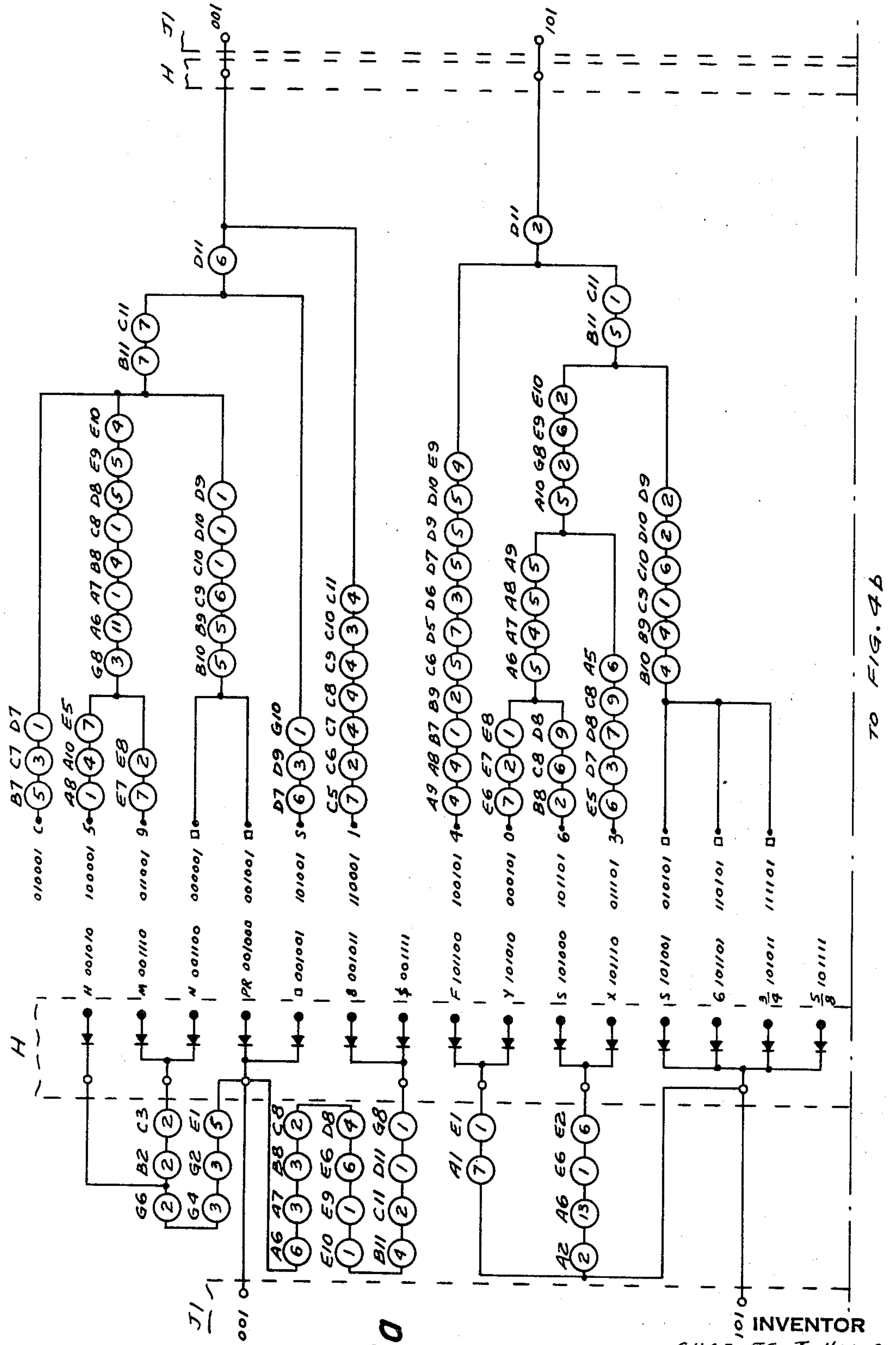
Figure 4B:
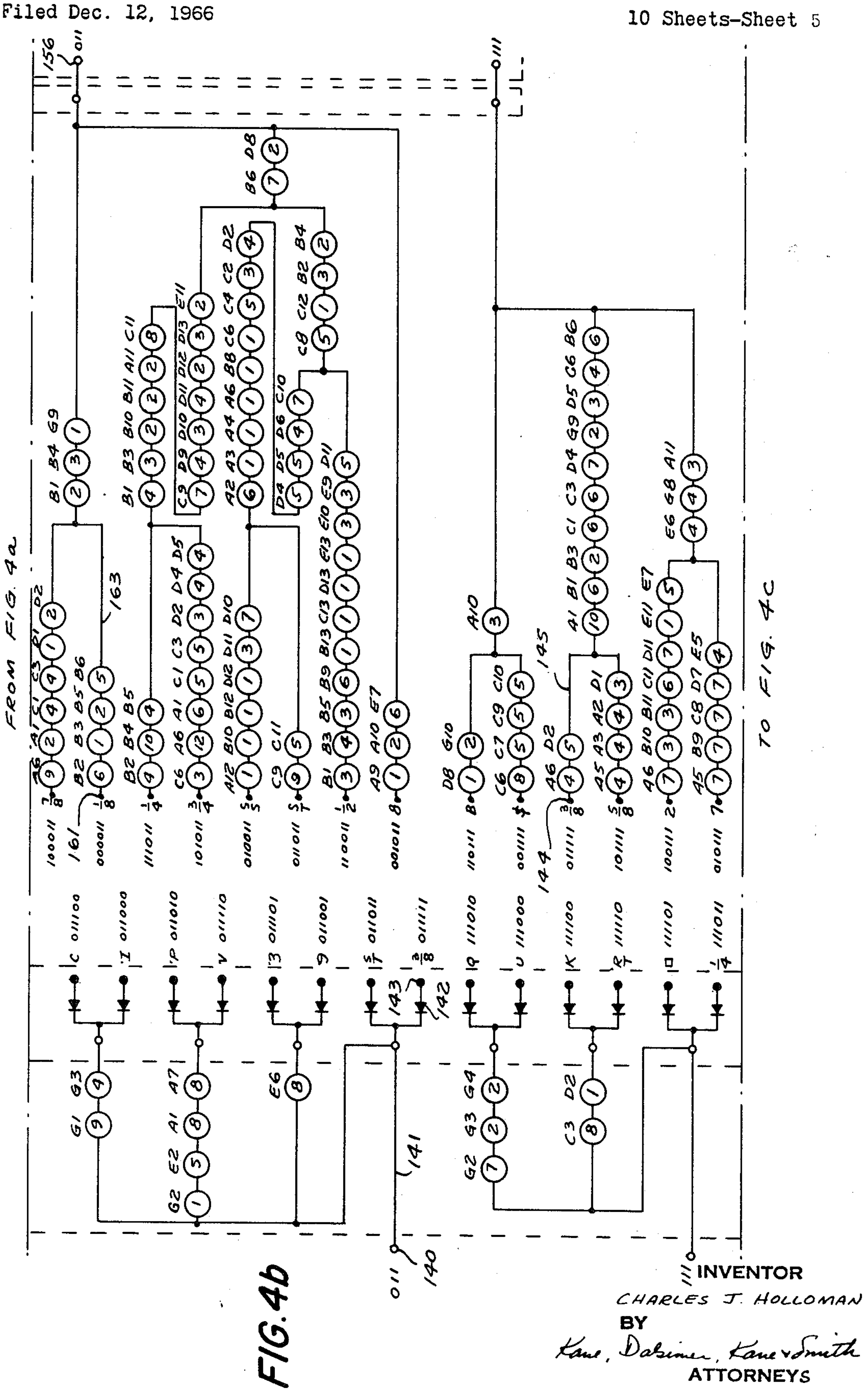
Figure 4C:
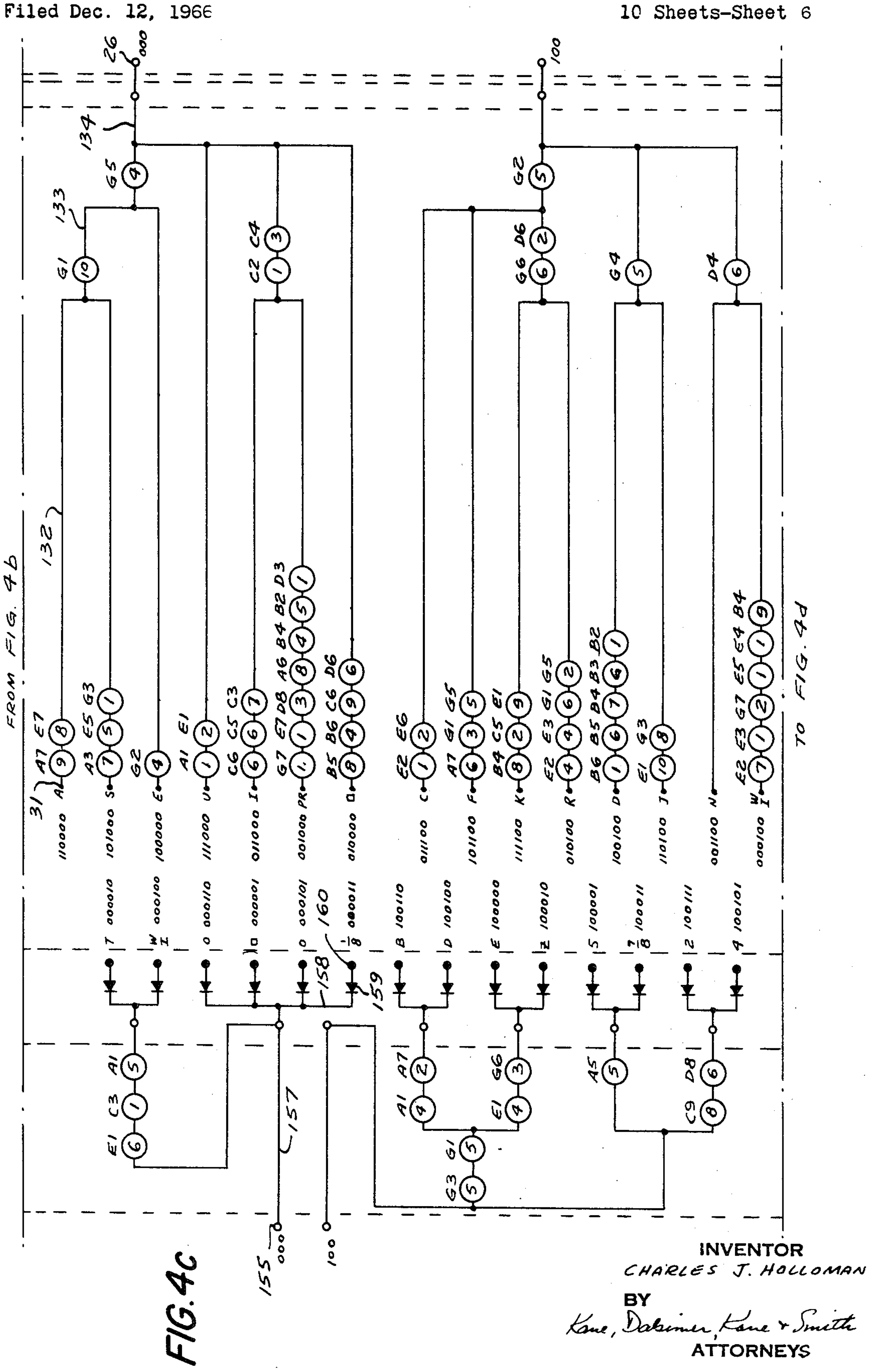
Figure 4D:
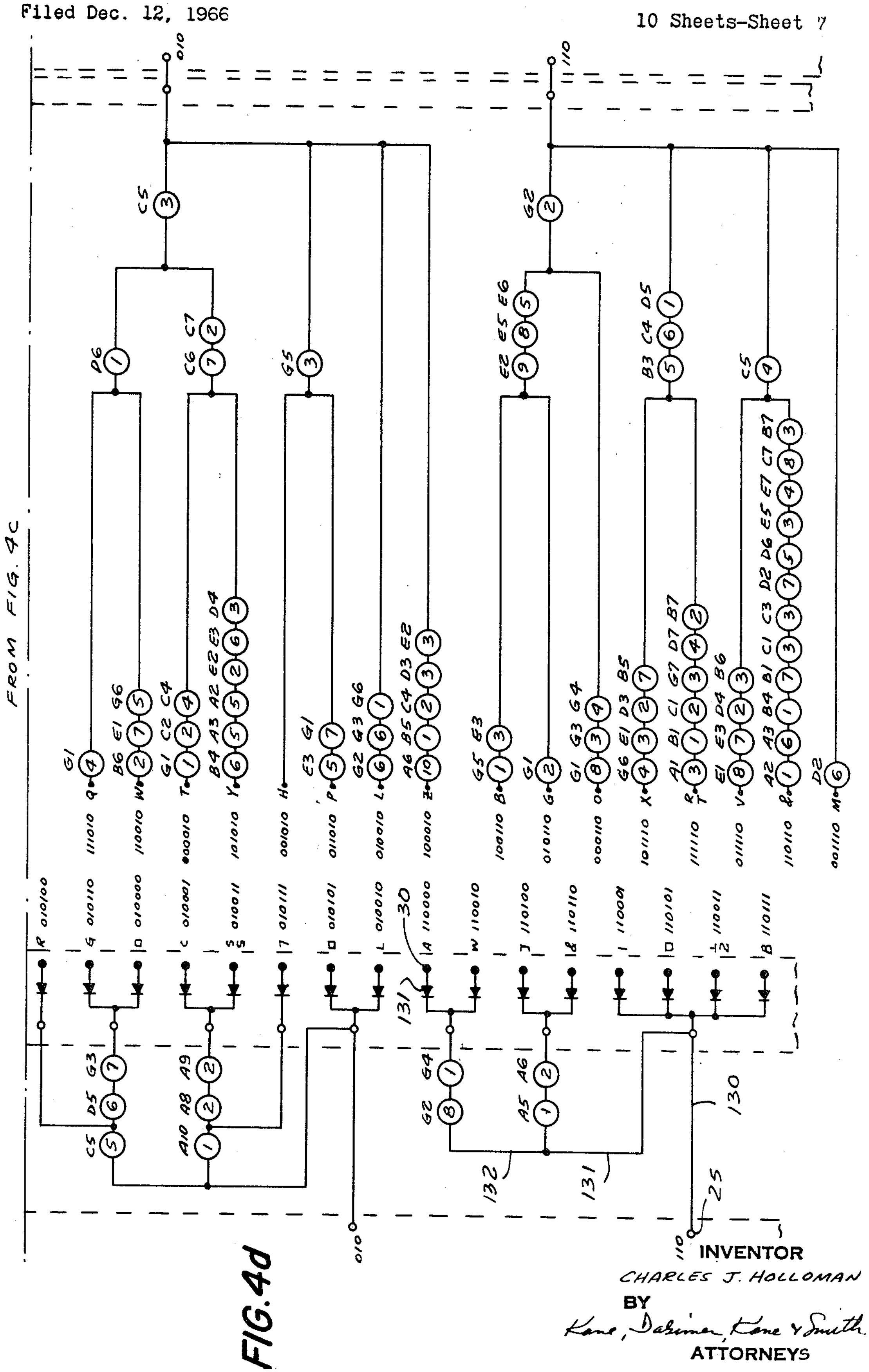
Figure 5:
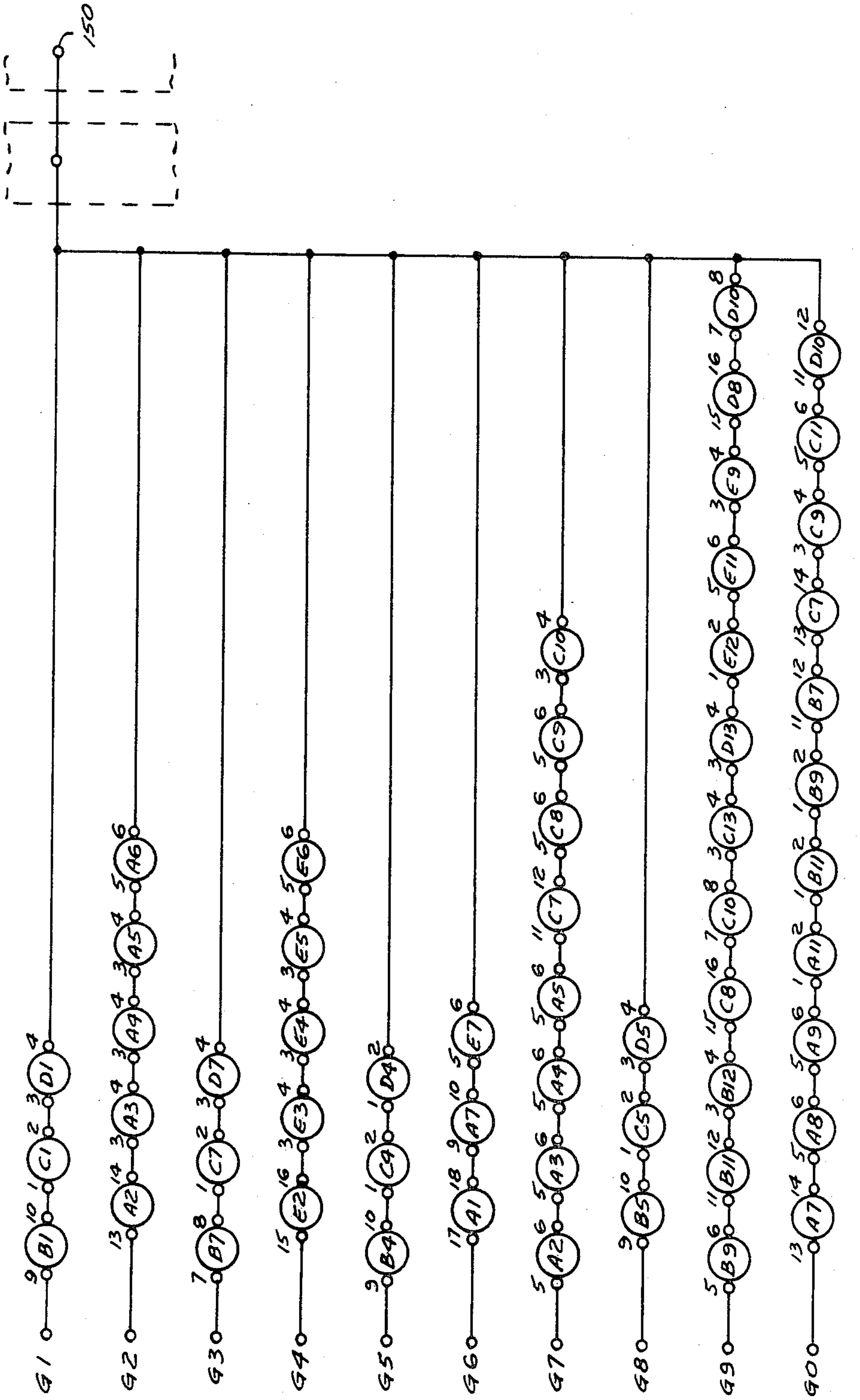
FIG. 5 is a diagram to represent connections for automatically establishing connections through a group of coils or windings serially connected one with another on the various cores.

In FIG. 5, where more room was permitted for illustration without cramping the winding positions, the winding designations and positions are shown inside the circled designations by letters and numbers to schematically represent windings. Illustratively, the designation B1 indicates a winding in the first row of column B. A designation E2, for instance, is indicative of a winding in row 2 in the position of column E. In FIG. 5, the designations shown by the numerals at either side of a designated winding indicates that the connections are to particular terminals. A designatiton of a winding, such as B1, with numerals 9 and 10 is equivalent, in the various parts of FIG. 4, to representing the entire winding by a numeral 5. Stated differently, windings 9 and 10 are the two windings or terminals of coil 5. Each set of designations is used for illustrative purposes and to show that the equivalent designations may be adopted where desired.

Turning now to FIG. 5, and bearing in mind for the moment the designations shown, any signal supplied to the component marked G2 reaches the terminal point G2 of FIG. 5 and there is supplied to the serially connected windings in positions A2 through A6, inclusive. These serially connected windings are represented by the serially connected windings 32 through 36 (FIG. 3*a*) which connect to terminal 37 in the column G showing of FIG. 3*b* on the one hand and to the ground terminal 39 on the other hand. Similarly, since connection G4 is energized, a reference to FIG. 5 will establish that this signifies that windings in all of positions 2 through 6 of column E have been energized. Thus, the energization of the group windings in positions G2 and G4 take into account all but the lowermost positions A7 and E7 of the left and right-hand columns of the letter A. The windings in these positions, however, are energized, as already expalined, in the path of terminal 31 through to group windings G1. The last positions to be energized to form a group of windings for providing the three upper positions such as B1, C1 and D1, as well as the center positions B4, C4 and D4, are controlled through the group winding control G1 passing through the serially connected windings B1, C1 and D1. Lastly, the group winding G5 connects, as shown by FIG. 5, through the serially connected windings B4, C4 and D4. The fact that there is a winding in any column is not in any way indicative of the fact that the winding is the only one in the particular case. To illustrate, and as can be seen from FIGS. 4*c* and 8 the letters B and T each require a display member activation for the first row of column A. This would be a winding in position A–1 (such as winding 20 in FIG. 3*a*) but as shown by FIG. 4*c* the position A–1 winding for letter B is winding #4 whereas for the letter T it is winding #5. The number external to the circle is the column and row while the number in the circle is the winding number on the core in the stated position.

Giving another example of the selection and ferrite core activation, consideration may now be given to the fraction 3/8 shown in the right-hand panel of FIG. 2. Because the showing of FIGS. 3*a* and 3*b*, for instance, were schematic and did not illustrate thirteen separate possibilities of control for different fractions, a full reference to the particular winding on the ferrite cores from which the fraction 3/8 may be developed has not been depicted. However, for explanation purposes, it may be assumed that the pattern is effective as if the upper three display members of the figure 3 were in row 1 and the lower two display members of the figure 8 were in row 13. It has already been mentioned that in the coding, a unit 1 in the sixth position signifies a number or similar character (see for instance the lower pattern of FIG. 8). Therefore, it can be seen that the number 3 is displayed by a display member in positions 1 and 6 of the first column or column A. With this, displayed members in column B in positions of rows 1, 3 and 6, as well as in the same positions in column C, form the next portion of the number 3 and the last or right-hand portions of the number 3 are formed by display members in column D in positions 2, 4 and 5. The numeral 8 formed below and a bit to the right of the numeral 3 has significant display members in columns B and E in positions 9, 11 and 12. Those display members which appear in columns C and D are in positions 8, 10 and 13.

With these thoughts in mind, reference may now be made back to FIG. 4*b*. Noting that the fraction 3/8, as per FIG. 1, is formed from a signal pulse binary code 011–111. The portion 011 may be applied at terminal point 140 and then fed by conductor 141 through the diode 42 to terminal 143. Terminal 143 then is, in effect, connected to terminal point 144 where the second portion of the binary coded pulses, namely, the 111 appear. At terminal 142, the signal passage is then through coil windings A6, D2, conductor 145 and thence through numerous coil windings A1, B1, B3, C1, C3, D4, group windings G9, D5, C6, B6.

By referring now to FIG. 5, where the pattern for group windings is displayed, it may be seen that group winding G9 connects individual windings B9, B11, B12, C8, C10, C13, D13, E12, E11, E9, D8 and D10 serially between the terminal G9 and the output terminal 150. Thus, windings connected in series and activated when connection is made between point G9 and point 150 is sufficient to energize core windings in series sufficient to store control pulses from which the complete numeral 8 may be formed. Verification of this fact may also be appreciated if note is made that in the formation of the fraction 1/8 for instance which, by the illustrated example, is formed from binary 000–011, the signal input may appear at input terminal 155 (FIG. 4*c*) as the 000 portion and the 011 portion of the signal may appear at terminal 156 (see FIG. 4*b*). The impressed pulses then, from terminal 155, are supplied by conductor 150 and conductor 158 through diode 159 to terminal point 160 (FIG. 4*c*) from which connection is made to terminal point 161 (see FIG. 4*b*) and thence through the schematically represented windings to terminal 156. The windings for the cores which connect serially between terminal 161 and terminal 156 are respectively windings in positions 2, 3, 5 and 6 of column 1, shown as windings B2, B3, B5 and B6. These, then, connect through conductor 163 through other serially connected windings B1 and B4, as well as group winding G9. It has already been explained that group winding G9 includes windings sufficient to form the figure 8 and it can readily be seen, from a consideration of FIG. 8, that the numeral 1 is formed from display members in all of positions 1 through 6 of column B which correspond to those indicated.

The drawings have been numbered with letters and figures, as above noted, so that by following the sequence of separate windings and group windings and considering group windings from the terminal points shown particularly on FIG. 5, any letter or figure character can readily be sensed.

By providing the group windings hereinabove identified for energizing the core windings, it is apparent that numerous separate windings otherwise required, can be saved. The showing of FIG. 6 sets out in columns and rows the number of set windings for each matrix core. For instance, in position 1 of column A, there would be ten separate windings about the core 15 which is in the first row. However, in this same first row, there would be only three windings in column D.

The foregoing is presented to illustrate the fashion by which the connections here shown make possible substantial reductions in the number of windings provided. Normally, the receipt of the coded binary input signal as supplied from the shift register, illustratively, such a circuit as shown in applicant's filed application, Ser. No. 600,875 entitled "Receiving Distributor Circuit" herein referred to, will cause the operation of the controlled jets and the therewith associated magnetic control members to shift from the upper ten positions to the lower thirteen positions. This shift, per se, is not part of this disclosure and, therefore, further explanation is not made..

In summary, the matrix circuitry hereinabove described provides numerous coincident current paths between various windings on each of the cores. These current paths all lead through diode elements into output components such as the SCR type of unit as shown at 112, 119 and so on. The circuitry provided isolates each of the components with respect to the output circuitry so that, for instance, activated windings in the different rows can supply their controlling effect upon the output circuitry individually with respect to the different columns of windings upon read-out and there shall not be a cross effect between the different components.

In the setting operation, this results in a generally serial activation of the cores through the different windings through the use of excess current applied thereto in order to form the necessary stored energy for later creating letters, figures or other indicia for observation. Also, in the setting of the magnetic effects by which the memory is achieved, in some instances, group activation of cores is relied upon in order thereby to reduce substantially the number of cores required for depicting each of the different effects.

In the read-out operation, with the various panels moving relative to a read-out point in sequence as designated by the arrow designations of FIG. 2, the read-out is achieved column by column. To obtain this effect, there is a common row output gate which connects to the output amplifying units.

Broadly speaking, the circuitry which has hereinabove been described thus provides and requires a minimum number of cores and windings and the currents required for activation are non-critical. The components set forth provide a self-storing system which does not require external memory during the read-out period.

Having now described the invention, what is claimed is:

1. A storage matrix system for representing selectable points of selected characters for individual display from a digital binary coded series of input intelligence pulses of the form $2^{m+n}$, where $m$ and $n$ are both whole numbers, and the intelligence pulses of the $m$ characteristic may vary within the $m$ grouping range in quantity and position between a single pulse and multiple pulses covering a part or all of the entire group of $m$ pulses, and $n$ is a pulse which, if present, is at all times at a like location in the series of $m+n$ pulse positions, comprising a first multiplicity of magnetizable cores arranged in a pattern of rows and columns, the said rows and columns providing a plurality of locations from which the cores may control the recreating of characters in accordance with the direction of magnetization of the individual core determined by each particular pulse series as received, said pattern being formed by simultaneous selection of a plurality of locations in said pattern whereat selected points of a character may be reproduced for display column by column, a plurality of individual windings on each of said cores, a plurality of input control terminals whereat the digital series of signal code intelligence signals $m+n$ are supplied, a second multiplicity of magnetizable cores including a second plurality of windings for operating each core of said second multiplicity under control of the input signals to energize a selected number of said first multiplicity of cores and thereby to activate a first group of display locations for signals received wherein $n$ is of a first form, said first multiplicity also activating a second group of display locations vertically displaced from said first group for signals received wherein $n$ is of a second form, means for selectively connecting the plurality of windings between the control terminals thereby to magnetize selected cores in one direction under control of the presence of input signal pulses, a readout winding for each magnetic core to reverse direction of magnetization in said core, means to energize columns of readout windings sequentially from a control point, an output winding connected with each core, electrical pulse energy of said output winding responsive to reversal of direction of magnetism of said magnetized core, and means for supplying derived electrical pulse energy from the core through the output winding to an output load circuit concurrently with application of a readout pulse.

2. The matrix system claimed in claim 1 for recreating characters in selected fashion which comprises, in addition, means for supplying readout pulses to each of the windows of said respective columns simultaneously, and means for sequentially energizing all selected windings prior to the application of the readout pulses.

3. The matrix storage system claimed in claim 2 comprising in addition,
- a common output circuit connected to the output windings of each row, and
- means for energizing the output circuit of all rows in which magnetic signal energy is stored concurrently with a switching of the output from one column to the next.

4. The matrix storage system claimed in claim 1 comprising, in addition,
- a common output circuit connected to the output windings of each row, and
- means for energizing the output circuit of all rows in which magnetic signal energy is stored concurrently with a switching of the output from one column to the next.

5. The matrix claimed in claim 1 comprising, in addition, means to interconnect selected core windings for activating said windings and the associated cores as a group.

6. The matrix claimed in claim 1 comprising, in addition,
- a common output gate for the cores of each row, and
- means to connect the said output in sequence to a load circuit.

References Cited

UNITED STATES PATENTS 2,575,017 11/1951 Hunt -------------- 178—30

(Other references on following page)

UNITED STATES PATENTS

| | | | |
|---|---|---|---|
| 2,920,312 | 1/1960 | Gordon et al. | |
| 3,130,397 | 4/1964 | Simmons | 178—30 |
| 3,296,603 | 1/1967 | Levy et al. | |

DONALD J. YUSKO, Primary Examiner

M. M. CURTIS, Assistant Examiner

U.S. Cl. X.R.

178—30; 340—166, 336